INVENTOR.
ALEXANDER TOTH
BY
ATTORNEY

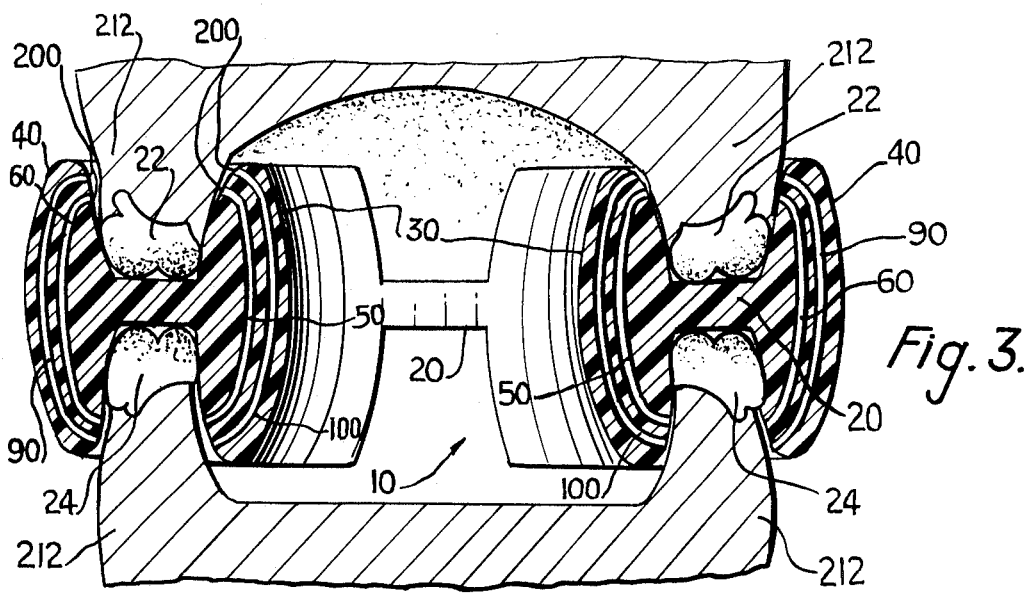
Fig. 3.
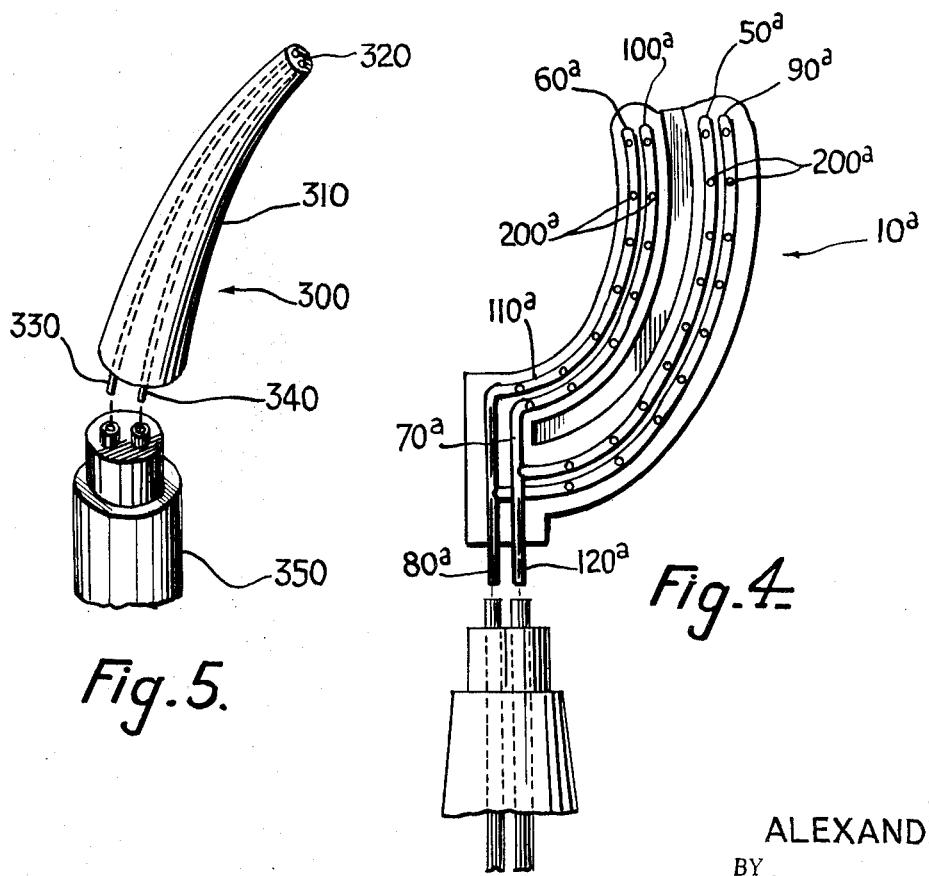
Fig. 5.
Fig. 4.
INVENTOR.
ALEXANDER TOTH
BY
ATTORNEY

INVENTOR.
ALEXANDER TOTH

United States Patent Office 3,516,402
Patented June 23, 1970

---

3,516,402
DENTAL GUM STIMULATOR
Alexander Toth, 80 Somerset St.,
New Brunswick, N.J. 08901
Continuation-in-part of application Ser. No. 614,071,
Feb. 6, 1967. This application Oct. 18, 1967, Ser.
No. 685,223
Int. Cl. A61h *13/00*
U.S. Cl. 128—66
14 Claims

ABSTRACT OF THE DISCLOSURE

An insulating mouthpiece which is adapted to be inserted in the mouth and contains two sets of water pipes, one connected to a hot water source and one connected to a cold water source. The pipes have small orifices which emit water through similar orifices in the mouthpiece. The orifices are positioned to direct alternate sprays of warm and cold water against the gums, particularly between the teeth. The mouthpiece may be a single tube, a full mouth structure, or a half-mouth structure.

---

This application is a continuation-in-part of abandoned application Ser. No. 614,071, filed Feb. 6, 1967.

Background of the invention

For the most part, humans have suffered from various gum problems, and many different types of apparatus have been devised for solving these problems by massaging or stimulating the gums. However, as is well known, no satisfactory apparatus has yet been devised to solve gum problems.

Summary of the invention

The invention, broadly, comprises a mouthpiece including means for stimulating the gums with sprays of both hot and cold fluid intermittently which creates hyperaemia.

Brief description of the drawing

In the drawing:

FIG. 3 is a sectional view along the lines 3—3 in FIG. 2;

FIG. 4 shows a modification of the invention; and

FIG. 5 shows still another modification of the invention;

Figure 1:
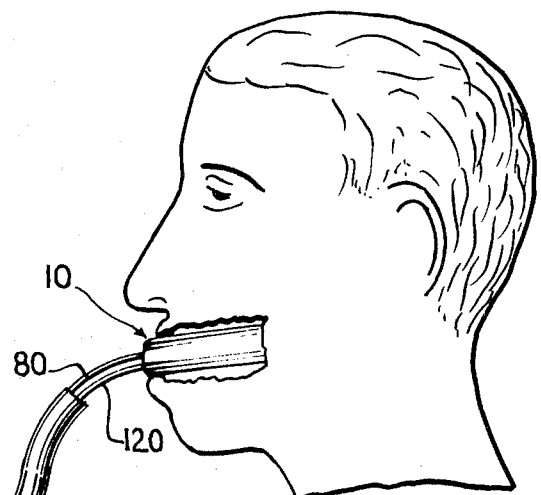
FIG. 1 is a perspective view of one embodiment of the invention as it is used.
Figure 2:
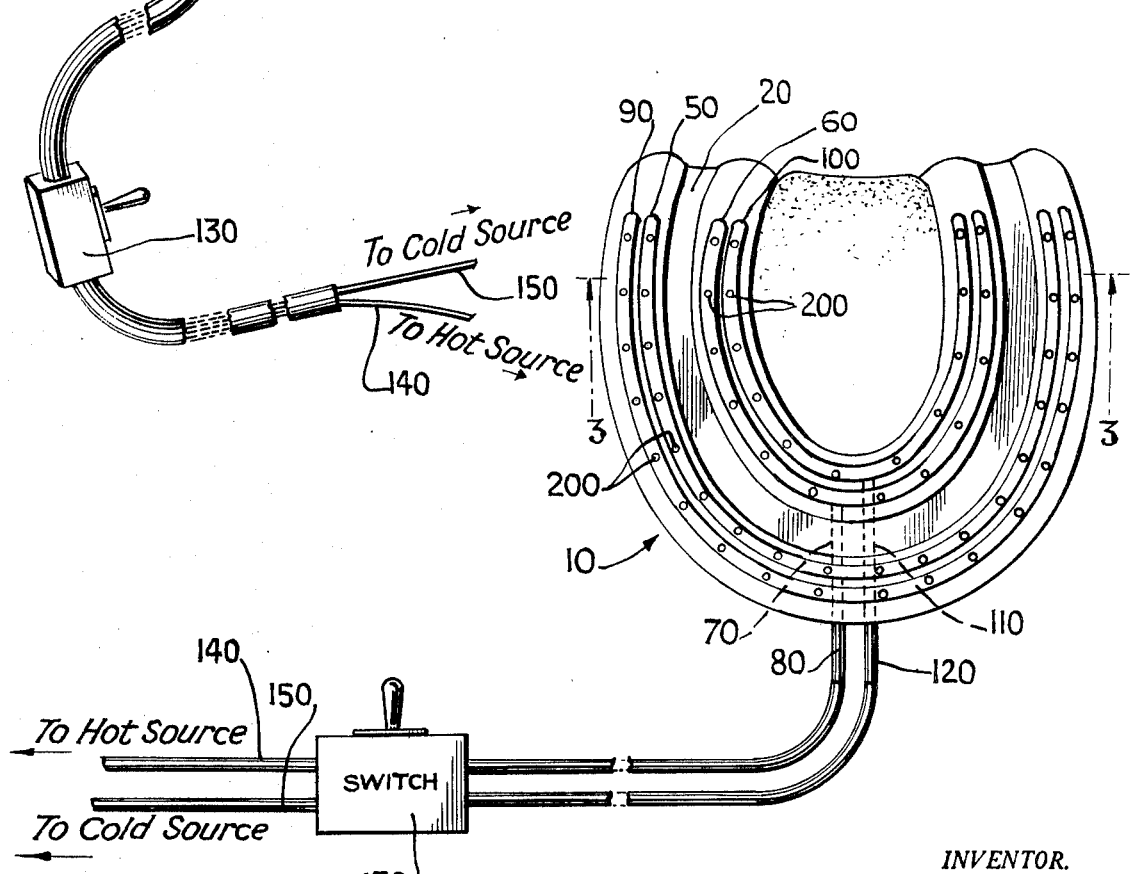
FIG. 2 is a plan view of the apparatus of FIG. 1.

The cold water array comprises two strips 90 and 100 which are positioned in the side walls 30 and 40 immediately adjacent to the cold water strips but remote from the web 20 and adjacent to the outer portions of walls 30 and 40 so that they are positioned closer to the gums and to the tongue. The two cold water strips 90 and 100 are connected together by a short length of tubing 110 suitably located in web 20, and the entire assembly is provided with an external pipe connection 120 which is adapted to be connected to a cold water supply to be described.

The external pipes 80 and 110 are most conveniently connected to the mouthpiece 10 in the vicinity of the portion thereof which is engaged by the front teeth. In addition, the outer cold water strip 90 may be suitably shaped, for example, it may include an opening, to permit pipe 80 to pass through it to reach the hot water array. These connections between and through the water pipes are most conveniently placed in web 20 so that they do not interfere with the set of the teeth on web 20. Those skilled in the art will have no difficulty in connecting pipes 80 and 120, and 70 and 110 to their strips within the mouthpiece.

The strips 50, 60, 90, and 100 are provided with a plurality of relatively small orifices 200 along their upper and lower margins which are aligned with orifices 210 in the walls 30 and 40 of the mouthpiece to direct sprays of water onto the gums 212, particularly into the spaces between the teeth 22.

It may be desirable to specifically shape the hot and cold water strips to direct the water sprays to desired locations. For example, the hot water strips may be shorter than the cold water strips so that the cold water apertures 200 are positioned above the hot water apertures and can direct spray onto the gums. The hot and cold water strips may also be curved to place their respective apertures 200 at the desired location.

Any suitable arrangement may be used to feed hot and cold water to the mouthpiece 10. One such arrangement includes a suitable switching mechanism 130 to which hot and cold water lines 140 and 150, respectively, are fed from hot and cold water sources, and from which hot and cold water lines run to the hot and cold inlets 80 and 120 to the mouthpiece. The switch 130 may be either manually or mechanically operated to alternately feed hot and cold water to the mouthpiece at the desired frequency.

A modification of the invention 10' shown in FIG. 4 comprises essentially one-half of the full mouthpiece described above. With this type of construction, one-half of the gums at a time can be stimulated.

Another modification of the invention shown in FIG. 5 is a localized, hand-operated device 300 which comprises an insulating tube 130 having at one end a relatively small opening 320 and including alternately hot and cold water pipes 330 and 340, respectively, extending along the length of the tube and having open ends terminating at the opening 320 in the tube. The device 300 can be connected by any suitable coupling member 350 to a source of hot and cold water, and the device can be used to spray hot and cold water alternately to selected areas of the gums.

Figure 6:
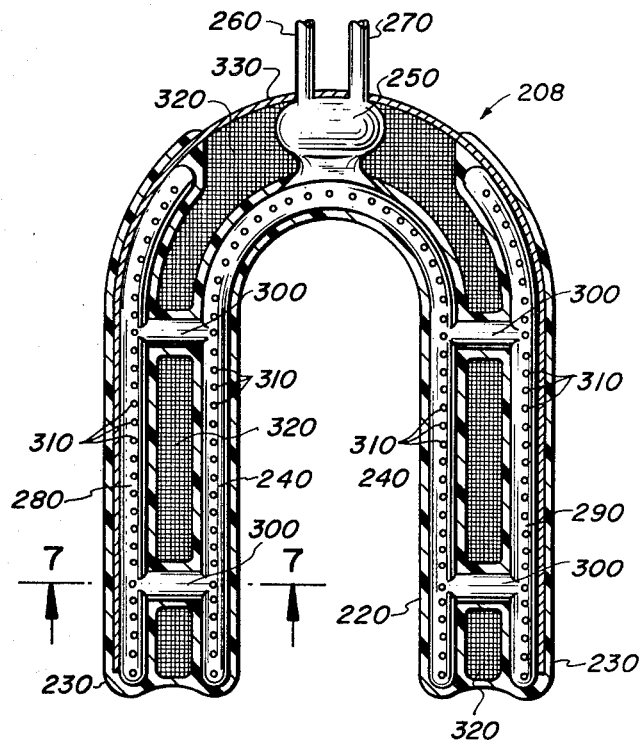
FIG. 6 is a plan view of a modification of the invention.
Figure 7:
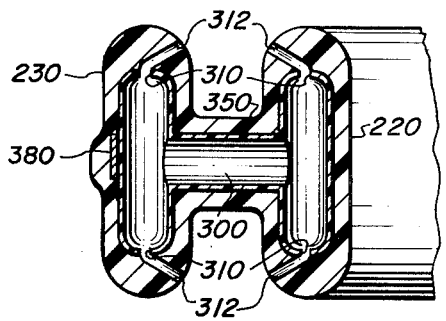
FIG. 7 is a sectional view on lines 7—7 in FIG. 6.

In a modification of the invention which permits simplified manufacture of basic mouthpieces which can be easily fitted to the mouth of the user, a mouthpiece 208 (FIGS. 6 and 7) includes the usual U-shaped inner wall 220 of a synthetic resinous material (a plastic) and an outer wall 230 which is connected to the inner wall at the left and right rear portions and extends forwardly to the front of the mouthpiece. A gap 236 is provided in the outer wall in the vicinity of the front of the mouthpiece.

A water pipe arrangement is provided which includes a first continuous inner U-shaped portion which extends from left rear to right rear within the inner wall 220 and includes a main throat 250 positioned at the front of the mouthpiece from which an inlet pipe 260 and an outlet pipe 270 extend. Left and right pipe portions 280 and 290, respectively, are embedded in the outer wall 230, and these pipes extend to close to the front of the mouthpiece within the outer wall. These pipes 280 and 290 are connected to the continuous inner pipe 240 through one or more small-diameter connecting pipes 300 which are, in effect, positioned in the web which lies between the upper and lower teeth in the completed mouthpiece. The inner and outer pipes 230, 280, and 290 include apertures 310 along their upper and lower margins for emitting water, and the inner and outer enclosing walls 220 and 230 include apertures 312.

The inner and outer walls 220 and 230 in which the water pipes are embedded are connected by a thin, open, mesh-like web 320 which extends from left rear to right rear of the mouthpiece. The web is also of a synthetic resinous material such as nylon.

According to the invention, the mouthpiece 208 also includes a flexible metal band or wire 380 which extends continuously from the left rear portion around the front of the mouthpiece across gap 236 to the right rear portion. The wire may be embedded in the outer wall 230 in contact with the outer pipes 280 and 290, or it may be secured to the outer surface of the outer plastic wall 230 and itself covered with a layer of resinous material. Any suitable mounting arrangement may be used.

In using this modification of the invention, the mouthpiece, as described above, is inserted in the mouth of the user, and the flexible wire 380 permits all portions of this mouthpiece to be suitably bent and adjusted to properly receive the teeth of the user. After the mouthpiece has been fitted in this way, the usual plastic impression material 350, such as a self-curing acrylic resin, is placed on the web in the upper and lower depressions formed between the inner and outer walls for both the upper and lower teeth, and this is inserted in the mouth to receive the upper and lower teeth and thereby to provide the desired casting of the teeth in the mouthpiece.

It is to be understood that the fluid conduits or pipes in mouthpieces embodying the invention comprise separate plastic or metal pipes inserted in the walls of the mouthpieces, or they may be formed as integral chambers in the side walls when the side walls are molded or otherwise formed.

In addition, it is clear that a single water inlet to the throat 250 may be provided, with a suitable external arrangement being used to feed cold and hot water alternately therethrough into the mouthpiece and into the mouth.

It is to be noted that the versatility of mouthpiece 208 may be still further enhanced by constructing it with extra long left and right portions which are cut to the proper length for the particular user. In such an application, the open ends of the water pipes inside the inner and outer walls can be easily closed by means of a synthetic resinous material or in any other suitable manner.

What is claimed is:

1. Dental apparatus comprising:
   an insulating body including a web adapted to be positioned between the upper and lower teeth of the user and at least one side wall which extends along the sides of the teeth and includes an edge which lies adjacent to a set of teeth and their gums,
   first and second fluid conduits in said side wall, one adapted to carry hot water and the other adapted to carry cold water,
   said side wall and said conduits having a series of aligned openings extending along said edge of said side wall through which water can be directed from each of said conduits onto said gums near said teeth.

2. Dental apparatus comprising:
   an insulating body including a web adapted to be positioned between the upper and lower teeth of the user and at least one side wall which extends along the sides of the teeth and includes upper and lower edges which lie adjacent to the gums,
   first and second fluid conduits in said side wall, one adapted to carry hot water and the other adapted to carry cold water,
   said side wall and said conduits having a series of aligned openings extending along said upper and lower edges through which water can be directed from each of said conduits onto said gums.

3. The apparatus defined in claim 2 wherein at least some of said openings are positioned to direct sprays of water into the spaces between adjacent teeth.

4. The apparatus defined in claim 2 wherein said conduits are oriented within said wall so that the hot water conduit is adjacent to said web and the cold water conduit is adjacent to the hot water conduit but remote from said web.

5. The apparatus defined in claim 4 wherein said web and side wall extend along the entire periphery of both sets of teeth.

6. The apparatus defined in claim 2 and including a second side wall with said web being positioned between said side walls, said hot and cold water conduits also being present in said second side wall, said second side wall and the hot and cold water conduits also having aligned openings through which hot and cold water can be sprayed.

7. Dental apparatus comprising:
   an insulating body including a web adapted to be positioned between the upper and lower teeth of the user, and
   an inner wall and an outer wall oriented with the web between them and extending along the entire periphery of the upper and lower teeth, whereby one wall is positioned between the teeth and the cheeks, and the other is positioned between the teeth and the tongue,
   said walls including upper and lower edges which lie adjacent to the gums,
   first and second pipes embedded in said walls, said first pipe being adapted to carry hot water, and said second pipe being adapted to carry cold water, said first hot water pipe being positioned in said inner and outer side walls immediately adjacent to said web, and said second cold water pipe being positioned to said first pipe remote from said web,
   said inner and outer walls having a series of apertures along said upper and lower edges thereof, and said first and second pipes having a series of apertures along their length and aligned with said apertures in said walls, whereby water can be sprayed from said pipes onto the gums of the user.

8. Dental apparatus comprising:
   an insulating body which is generally U-shaped and has the contour of a set of teeth,
   first and second conduits embedded in said body, one adapted to carry hot water and the other adapted to carry cold water,
   said body and said conduits having aligned openings through which water can be directed from each of said conduits onto the gums of an individual, and
   a flexible metal band secured to said body whereby the body may be bent and adjusted by manipulation of said band.

9. The apparatus defined in claim 2 wherein said body is generally U-shaped and said web is an apertured mesh-like member interconnecting said inner and outer walls and adapted to receive and support synthetic resinous material bearing the impressions of the upper and lower teeth, and a flexible metal band secured along the length of said body whereby said body can be bent, shaped and adjusted to selectively position the portions thereof with respect to each other before said synthetic resinous material and the tooth impressions are applied to said web.

10. The apparatus defined in claim 2 wherein said web is an apertured mesh-like member interconnecting said inner and outer walls and adapted to receive and support synthetic resinous material bearing the impressions of the upper and lower teeth.

11. The apparatus defined in claim 2 wherein said body is generally U-shaped to conform to the configuration of the teeth and includes left and right channels for receiving the teeth, said channels being defined by inner and outer walls in which said pipes are embedded, said channels being longer than the corresponding sets of teeth with which they are to be used, said left and right channels being adapted to be cut to fit the mouth of the user.

12. The apparatus defined in claim 11 and including a continuous flexible metal band extending along said body for permitting said channels of said body which comprise the legs of the "U" to be adjusted with respect to each other.

13. The apparatus defined in claim 11 and including a mesh-like web interconnecting said inner and outer walls of each channel and adapted to receive synthetic resinous material in which is formed the impression of the upper and lower teeth.

14. The apparatus defined in claim 11 and including a continuous flexible metal band extending along said body for permitting said channels of said body which comprise the legs of the U to be adjusted with respect to each other, and a mesh-like web interconnecting said inner and outer walls of each channel and adapted to receive synthetic resinous material in which is formed the impression of the upper and lower teeth.

References Cited

UNITED STATES PATENTS

| | | | |
|---|---|---|---|
| 803,475 | 10/1905 | Dennis | 128—224 |
| 1,500,107 | 7/1924 | Chandler. | |
| 1,733,054 | 10/1929 | Crill | 128—66 |
| 2,957,476 | 10/1960 | Freeman | 128—229 |
| 3,379,192 | 4/1968 | Warren | 128—66 |

L. W. TRAPP, Primary Examiner